United States Patent
Goldberg et al.

(10) Patent No.: US 10,204,435 B2
(45) Date of Patent: Feb. 12, 2019

(54) MULTI-GRANULAR RIGS FOR DISTRIBUTED NODE-BASED INTERACTIVE WORKFLOWS

(71) Applicant: Disney Enterprises, Inc., Burbank, CA (US)

(72) Inventors: Evan Goldberg, Burbank, CA (US); Gene Lee, La Canada, CA (US); Christian Eisenacher, Burbank, CA (US); Chung-An Lin, Cerritos, CA (US); Gregory Smith, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 119 days.

(21) Appl. No.: 15/282,264

(22) Filed: Sep. 30, 2016

(65) Prior Publication Data

US 2018/0096509 A1    Apr. 5, 2018

(51) Int. Cl.
  *G06T 11/20*  (2006.01)
  *G06T 13/20*  (2011.01)
  *G06T 1/60*  (2006.01)

(52) U.S. Cl.
  CPC .............. *G06T 13/20* (2013.01); *G06T 1/60* (2013.01); *G06T 11/206* (2013.01); *G06T 2207/20044* (2013.01)

(58) Field of Classification Search
  CPC ......... G06T 11/206; G06T 13/20; G06T 1/60; G06T 17/20; G06T 2207/20044
  See application file for complete search history.

(56) References Cited

U.S. PATENT DOCUMENTS

2013/0194279 A1* 8/2013 Watt ..................... G06T 13/40
                                                    345/473
2014/0108485 A1   4/2014 Geibel et al.
2016/0307353 A1* 10/2016 Ligenza ................ G06T 13/20

OTHER PUBLICATIONS

Lin et al., Achieving Real-Time Playback with Production Rigs, SIGGRAPH '15 ACM SIGGRAPH 2015 Talks, 2015, p. 1, Article No. 11, New York, NY.

* cited by examiner

*Primary Examiner* — Samantha (Yuehan) Wang
*Assistant Examiner* — Michael Le
(74) *Attorney, Agent, or Firm* — Sheppard Mullin Richter & Hampton LLP (57) ABSTRACT

Systems and methods are described for leveraging distributed computation systems to split animation application processing of node graphs into two components: 1) a low complexity, primary node graph, that is evaluated by the application of the local device; and 2) one or more, higher complexity, companion node graphs that connect to the primary node graph, and are evaluated by a distributed computation system. As the local device evaluates the original, low complexity node graph, an artist is provided with fast, direct manipulation of an animated object. At the same time, the distributed computation system evaluates the higher complexity, companion node graphs, thereby providing a user of the local application with higher fidelity versions of the primary node graph as they are computed.

20 Claims, 8 Drawing Sheets

MULTI-GRANULAR RIGS FOR DISTRIBUTED NODE-BASED INTERACTIVE WORKFLOWS

TECHNICAL FIELD

The present disclosure relates generally to distributed computing techniques for animating rigs, and more particularly, some embodiments relate to systems and methods for using multi-granular rigs in distributed node-based interactive workflows.

DESCRIPTION OF THE RELATED ART

Skeletal animation is a computer animation technique that represents an object in two primary parts: 1) a mesh that is a surface representation of the object, and 2) a set of interconnected joints (i.e., a rig) used to animate the mesh. Generally, a joint may refer to a bone and the pivot about which it rotates, or a joint may just refer to a pivot. Joints may be related in a hierarchy by joint transformations. Skeletal animation may be applied to transform any object that implements this mesh and rig structure. For example, it may be applied to a whole or a part (e.g., arm, leg, hand, foot, torso) of an animated character, creature, or similar object. Alternatively, it may be applied to animations of other objects, such as clothing, a door, a fork, etc.

During animation, a rig may be represented as a set of nodes of a node graph (e.g., a directed acyclic graph), each node having corresponding input and output attributes. The attributes of a node describe its data, with each node type having a different set of attributes. For example, the nodes associated with an animating sphere may comprise attributes such as radius, angular momentum, position, color, and transparency. During animation of a rig, all or a subset of the rig's nodes are evaluated as data flows along the connections in its graph. While the node graph is evaluated, its data is visually rendered as a static image or an animated scene on a display via a viewport.

Animation rigs used in film productions are extremely complex. In many cases, these rigs comprise tens of thousands of nodes, with each node having many input attributes and/or computationally expensive operations. Such rigs use all of these nodes to generate appealing shape deformations on computer-generated characters.

Currently, resource intensive node-based graphical software applications that process complex node graphs are relegated to high-performance desktop computers. Laptops, tablets, and other mobile devices generally lack the resources to run these applications efficiently. Moreover, even high-performance desktop systems may take considerable time to process node graphs of complex animated scenes, developed on software applications such as Nuke®, Maya®, and Houdini®.

BRIEF SUMMARY OF THE DISCLOSURE

Embodiments of the technology disclosed herein leverage distributed computation systems to split animation application processing of node graphs into two components: 1) a low complexity, primary node graph, that is evaluated by the application of the local device; and 2) one or more, higher complexity, companion node graphs that connect to the primary node graph, and are evaluated by a distributed computation system.

In a first embodiment, a method, includes: spawning within a server system a server process that communicates over a network; receiving first node graph data, second node graph data, and set of input attributes at the server system, where the second node graph is a companion node graph of the first node graph; processing the second node graph data at the server process based on the set of input attributes; and transmitting the processed second node graph data to a computing device. In various implementations, the first node graph and the second node graph may be associated with a rigged object, and the second node graph data may be processed to render a higher fidelity representation of all or a subset of the rigged object. In further implementations, the first node graph may instantiate the second node graph.

In one implementation, the method further includes: receiving third node graph data at the server system, where the third node graph is a companion node graph of the first node graph, and the third node graph has a higher complexity than the second node graph; processing the third node graph data at the server process based on the set of input attributes; and transmitting the processed third node graph data to the computing device. The second node graph and the third node graph may be hierarchical.

In one implementation, the method further includes: receiving the processed second node graph data at the computing device; and evaluating, at the computing device, a portion of the first node graph based on the processed second node graph data. In this implementation, the server processed second node graph data may be transmitted to the computing device in response to a request initiated at an application running on the computing device.

In a second embodiment, a method includes: initiating a node graph application instance at a computing device, the node graph application instance displaying an object comprising a rig; processing first node graph data of the rig at the application based on input attributes received at the computing device; initiating a request at the computing device for a server system to process second node graph data of the rig based on the input attributes, where the second node graph data is a higher complexity representation of the first node graph data; and receiving the server system processed second node graph data at a viewport in the application. In one implementation, the method further includes: receiving the processed first node graph data at the viewport of the application, and the step of receiving the server system processed second node graph data at the viewport comprises replacing the processed first node graph data with the processed second node graph data at the viewport.

As used herein to refer to a node graph, the term "complexity" generally refers to an amount of time required to process all nodes of the node graph by a computational system. A second node graph that is a "higher complexity" than a first node graph will take longer to be processed by the computational system than the first node graph. The complexity of a node graph may depend on the number of nodes in the graph, the number of connections in the graph, and the time and space requirements of each node. Other contributing factors include the complexity of operations and the availability of resources.

As used herein, "companion node graph data" refers either to a node graph data that is a higher complexity representation of all or a subset of a first set of node graph data; or to a node graph data that is evaluated in addition to the first set of node graph data to provide a higher fidelity representation of the first set of node graph data.

As used herein, a "rig control" generally refers to a control for controlling how a node graph evaluates and deforms an animated object. A rig control may be used to define a shape, position, color, texture, or other property of an animated object or a part of an animated object. For example, for an animated character, a rig control may specify a position of a hand, a shoulder rotation, an amount an eye closes, etc. During animation, an animator may manipulate a rig control to interact with an animated object.

A rig control is associated with one or more rig control values. For instance, one rig control may have rig control values for the location, scale, and orientation of a character's hand. A rig control value may assume a wide variety of variable or value types, such as, for example, a floating point variable, an integer variable, a boolean variable, an enumerated variable type, a percentage, a clamped range, etc.

As used herein, a "pose" generally refers to a particular combination or configuration of rig control values corresponding to a rig of an animated object. For example, for an animated character comprising 3000 rig control values, a pose may comprise 3000 values that define an output shape of the character.

As used herein, a "shape" of an animated object refers to a form and characteristic appearance of an animated object. A shape may be represented as a mesh, a nurb, a curve, etc.

Other features and aspects of the disclosed method and system will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION OF THE EMBODIMENTS OF THE DISCLOSURE

Figure 1A:
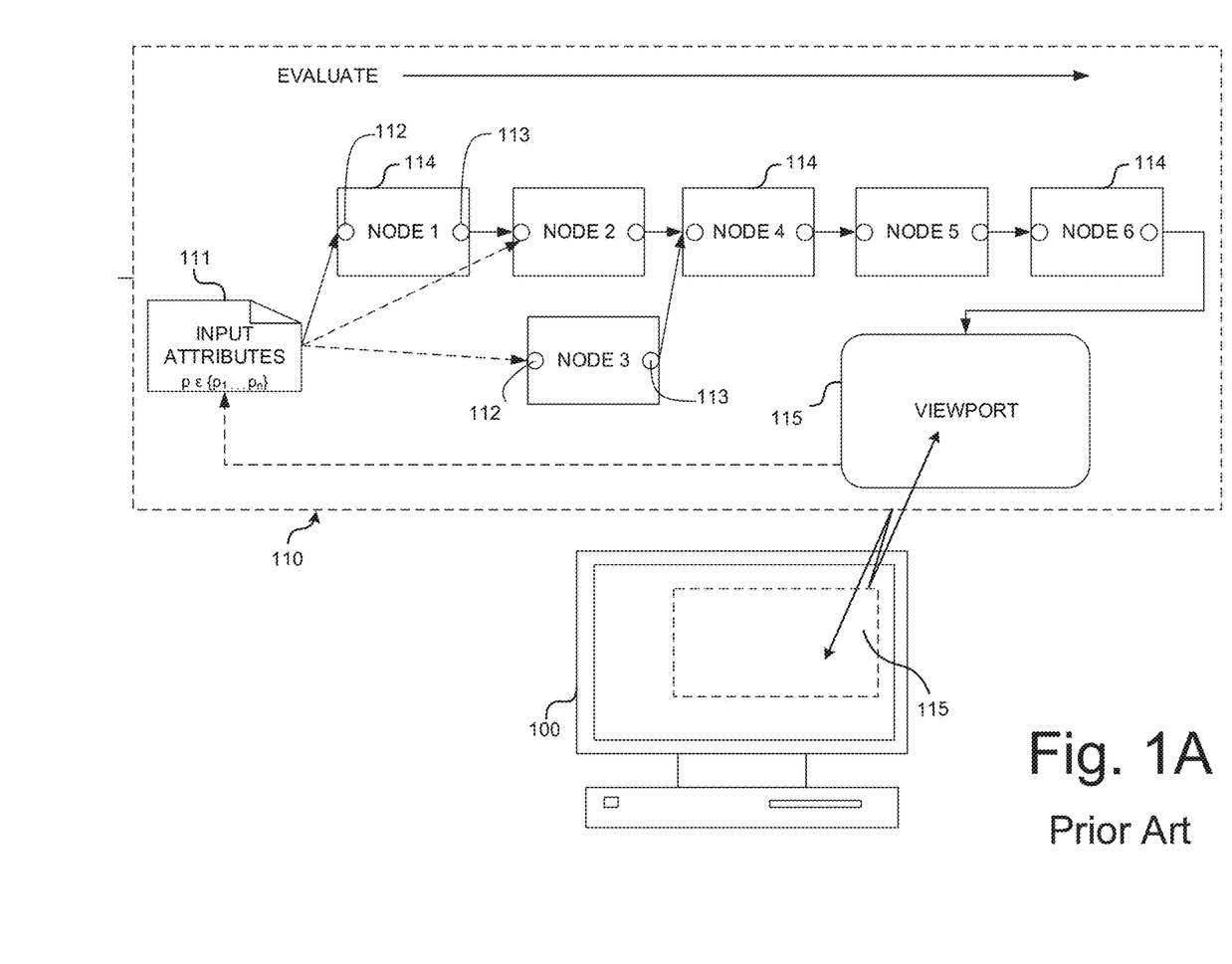
FIG. 1A illustrates a conventional desktop environment in which node based graphical applications are processed.

Before describing the disclosed method and system in detail, it is useful to describe a conventional desktop environment in which node-based graphical applications are processed. FIG. 1A illustrates the conventional desktop environment. Desktop workstation 100 initiates a node graph application instance 110 to process node graph data (i.e., one or more nodes and their corresponding connectivity in a node graph). In this example environment, the node graph comprises six nodes. Each depicted node may comprise a single node or a group of nodes. The processed node graph data is visually rendered as a static image or animation scene on the monitor of workstation 100 via viewport 115. The user of workstation 100 can modify the input attributes 111 of nodes in the node graph by manipulating objects in viewport 115 or by directly updating the input attributes 111 of a node 114 in the node graph. For example, a user may modify rig control values during interactive manipulation of an animated character.

The attributes of a node describe the data that the node stores and edits. For example, the nodes associated with an animation sphere may comprise of attributes such as radius, angular momentum, position, color, and transparency. Groups of nodes 113 may share input attributes 111, or alternatively, multiple nodes can have their own sets of input attributes. In this desktop environment, input attributes may be modified at any node in the graph. Once the input attributes 111 are modified, workstation 100 begins evaluating the node graph in sequence. In this example, Node 1 receives input attributes at input 112. After input attributes 111 are processed at node 1, node 1 output 113 passes output attributes to node 2's input. Node 4's input 112 waits for input data from the outputs of Node 2 and Node 3. This process continues until the data is processed at node 6, the final node in the graph. The fully-evaluated node graph data is visually rendered through viewport 115.

Figure 1B:
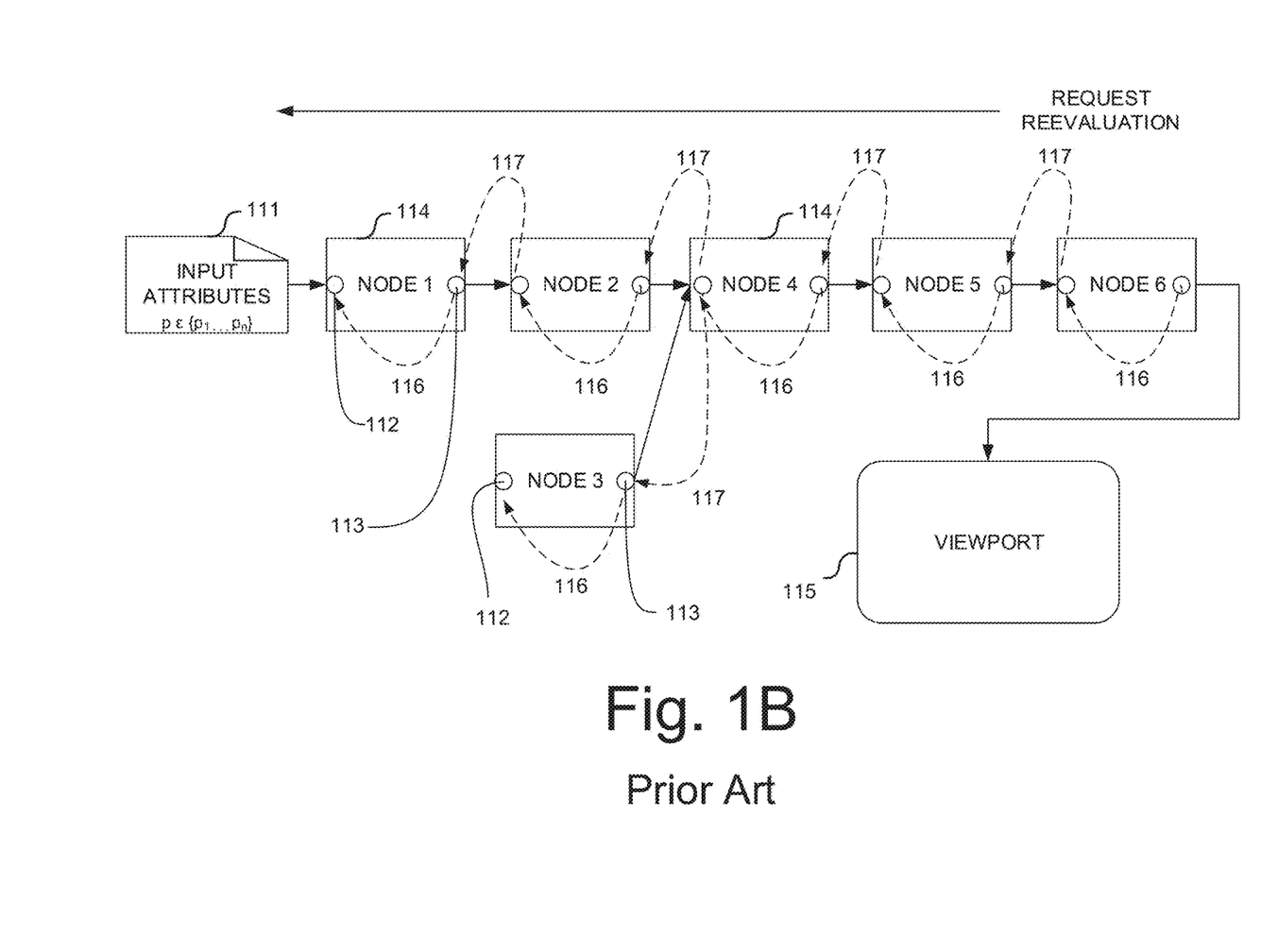
FIG. 1B illustrates a conventional desktop environment in which node based graphical applications are processed.

Each time an input to node graph is modified or a call to evaluate the node graph is executed, this evaluation process repeats by passing only data that needs to be recalculated. Node graph applications accomplish this process efficiently by flagging a node's inputs 112 and outputs 113. When an input value 112 is changed, the node's dependent output 113 is flagged. Any connection to the flagged output 113 is also flagged and this propagation continues until the last possible node is reached. As illustrated in FIG. 1B, when the node graph application requests a node graph reevaluation, the node graph application checks if a node's outputs are flagged, starting with the last or terminal node of the node graph. For example, if Node 6 determines it is flagged at 116, it is instructed to evaluate itself. When that node evaluates, it sees that its inputs are flagged and asks any connected input node at 117 to reevaluate itself. As the inputs and outputs of the nodes are evaluated, the inputs and outputs are unflagged. This process continues until the critical data in the node graph is reevaluated, and the inputs and outputs are no longer flagged. In this manner, only flagged nodes are evaluated.

In the desktop environment of FIGS. 1A-1B, all node graph data is processed locally on workstation 100. As the complexity of the node graph increases, the speed at which the node graph data in application instance 110 is evaluated and rendered on viewport 115 is limited primarily by the processing capabilities of workstation 100. In this desktop environment, the processing power of the user's workstation 100 is the bottleneck for the efficient processing of complex node graphs of animation scenes.

Embodiments of the technology disclosed herein leverage distributed computation systems to split animation application processing of node graphs into two components: 1) a low complexity, primary node graph, that is evaluated by the application of the local device; and 2) one or more, higher complexity, companion node graphs that connect to the primary node graph, and are evaluated by a distributed computation system. As the local device evaluates the original, low complexity node graph, an artist is provided with fast, direct manipulation of an animated object. At the same time, the distributed computation system evaluates the higher complexity, companion node graphs, thereby providing a user of the local application with higher fidelity versions of the primary node graph as they are computed.

For example, consider an animator manipulating the arm controls of a rigged character rendered on a viewport. The rigged character may be associated with a primary node graph, a subset of which is used to evaluate the arm of the character. The subset of the primary node graph used to evaluate the arm may be connected to a companion node graph that may be evaluated to provide a higher fidelity representation of the rigged character's arm. As the rig control values are modified, the primary node graph for the character's arm is evaluated by the animator's local device. Additionally, a request may be initiated at the animator's local device for a server system to evaluate the companion node graph. Upon evaluation of the primary node graph by the local device, a low fidelity representation of the arm may be rendered or drawn on the viewport. Upon the server system's evaluation of the companion node graph, the evaluated companion node graph may be sent back to the local device to display a higher fidelity representation of the arm.

Figure 2:
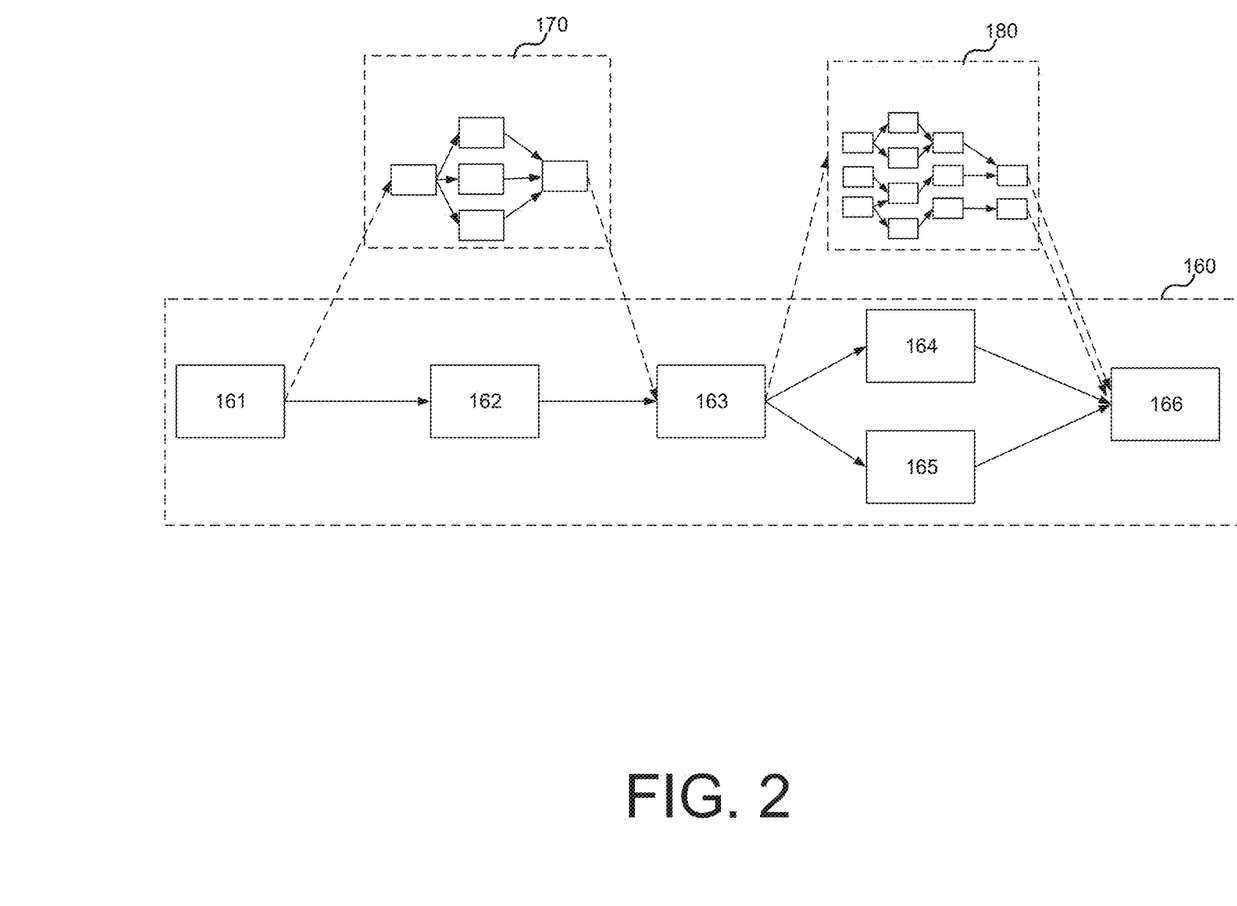
FIG. 2 illustrates one example of a primary node graph connected to companion node graphs in accordance with the disclosure.

FIG. 2 illustrates one example of a primary node graph 160 connected to companion node graphs 170 and 180 in accordance with the disclosure. As noted above, a companion node graph is a higher complexity representation of all or a subset of another node graph. Most often, the initial inputs and final outputs of the two graphs are similar, so as to make the two graphs interchangeable. However, the companion node graph is free to have additional inputs and outputs. Companion node graphs 170 and 180, in this example, are respectively higher complexity representations of node 162 and node group 164-165 of primary node graph 160. For example, if evaluation of node 162 performs a single rigid transformation (e.g., rotation or translation) of all of a rigged character's toes, evaluation of companion node graph 170 may perform a separate rigid transformation for each of the rigged character's toes. As another example, if evaluation of nodes 164-165 performs linear skinning of a rigged character's arm, evaluation of companion node graph 180 may perform dual quaternion skinning of the rigged character's arm.

It should be noted that although companion node graphs 170 and 180 are illustrated in this example as having a greater number of nodes than respective node groups 162 and 164-165, the higher complexity of companion node graphs 170 and 180 may be due to other factors. For example, node graphs 170 and 180 may have a greater number of node connections, involve greater processing per node, greater resource consumption, greater hardware requirements, etc. Additionally, although companion node graphs 170 and 180 are illustrated in this example as replacing respective node groups 162 and 164-165, companion node graphs 170-180 may provide additional data that is evaluated in addition to the data evaluated by node groups 162 and 164-165.

Node 162 and its corresponding companion node graph 170 receive, as an input, the same output attributes from node 161, and send, as an output, input attributes to node 163. In embodiments, node graph 170 or node 162 may use all or a subset of the attributes received from node 161 for evaluation. For example, as node graph 170 is higher complexity than node 162, in some implementations node graph 170 may be evaluated using all input attributes received from node 161 whereas node 162 may be evaluated using only a subset of these input attributes.

Nodes 164-165 and their corresponding companion node graph 180 receive, as an input, the same output attributes from node 163, and send, as an output, input attributes to node 166. In embodiments, node graph 180 or node 164-165 may use all or a subset of the attributes received from node 163 for evaluation.

Figure 3:
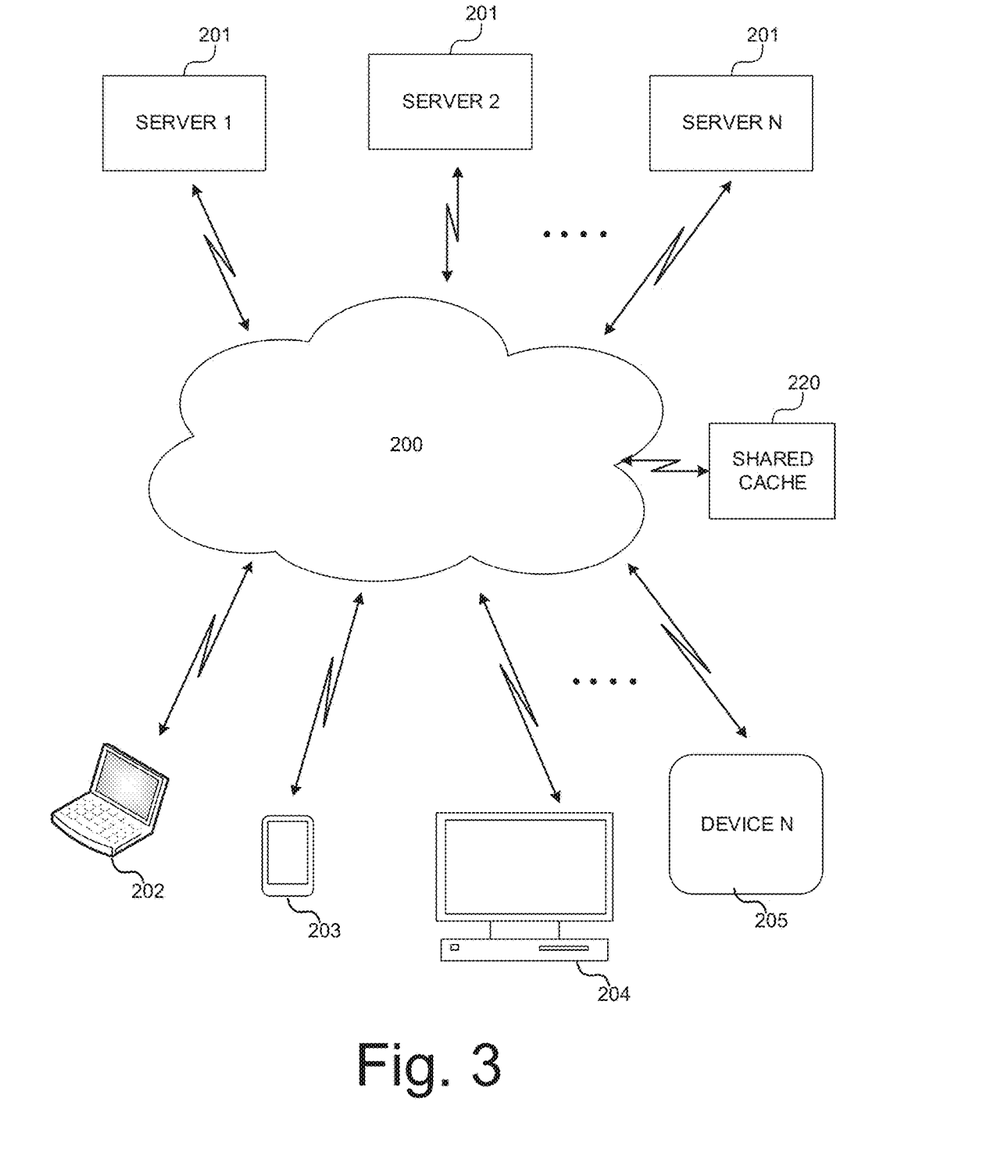
FIG. 3 illustrates one example of a distributed computing communication system for processing node based graphical applications.

FIG. 3 illustrates one example of a distributed computing communication system for distributed node based graphical workflows. The communications system includes a plurality of computing devices 202-205, each communicating with other computing devices 202-205 and servers 201 through communications network 200. Computing devices 202-205 may comprise, but are not limited to, workstation, desktop, laptop, notebook, and tablet computers; hand-held devices such as tablets, smartphones, cellphones, and palmtops; and wearable devices such as head-mounted displays. In communications network 200, the processing of some or all of the rigs (e.g., node based graphical data) generated by users operating computing devices 202-205 is distributed over one or more servers 201. In some embodiments, these servers perform grid computing.

As used herein, communications network 200 may refer to any network that allows for a distributed computing system. Communications network 200 may include a cloud computing network, an ad hoc network, an intranet, an extranet, a virtual private network (VPN), a local area network (LAN), a wireless LAN (WLAN), a wide area network (WAN), a cellular telephone network, a satellite network, or any combination thereof. Communications network 200 may use a number of communication mediums. The communication medium may be a wired system, such as a coaxial cable system, a fiber optic cable system, an Ethernet cable system, or other similar communication medium. Alternatively, the communication medium may be a wireless network system, such as a wireless personal area network, a wireless local area network, a cellular network, or other similar communication medium.

In the communication system of FIG. 3, the results of evaluated node graphs (e.g., evaluated rigs), including primary node graphs and companion node graphs, may be cached in a shared cache 220. For example, given a set of rig controls and values defining a pose, that pose may be associated with a shape determined by evaluating the rig (i.e., by evaluating a node graph and/or companion node graphs). Shared cache 220, in embodiments, may be distributed across multiple hosts (e.g., servers 201 and/or devices 202-205) with the poses of past and future frames. Each host may pre-populate cache 220 with evaluated node graphs. In some instances, the cached, evaluated node graphs may comprise different fidelity representations of the same underlying object. For example, both low fidelity and high fidelity versions of a pose of a rigged character or a subset of the rigged character may be cached. In this manner, relying on cached pose data, a host may process a pose request for a rig during an animation session.

Figure 4:
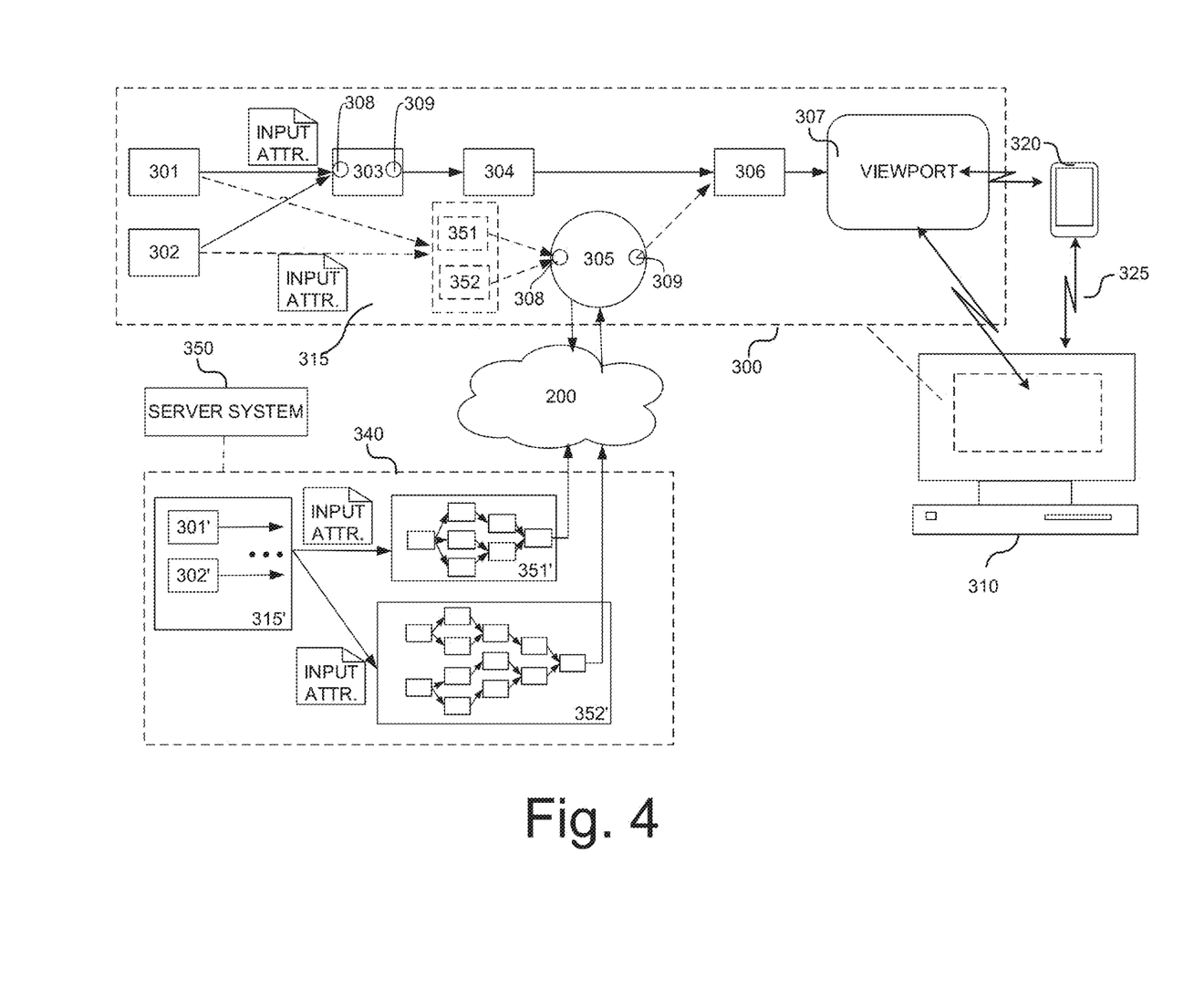
FIG. 4 illustrates an exemplary embodiment of a node based graphical workflow in accordance with the distributed computing communication system of FIG. 3.

FIG. 4 illustrates an exemplary embodiment of a node based graphical workflow in accordance with the distributed computing communication system of FIG. 3. Workstation 310 initiates node graph application instance 300. The node graph 315 of application instance 300 is rendered on the monitor of workstation 300 via viewport 307. Node graph 315 includes a primary node graph, including nodes 301, 302, 303, 304, and 306, each node having respective inputs 308 and respective outputs 309. In addition, node graph 315 may include companion node graphs 351 and 352. Each of companion node graphs 351-352 may provide a higher complexity representation of all or a subset of the primary node graph. For instance, in the example of FIG. 4, each companion node graph 351-352 may provide a higher complexity representation of nodes 303-304.

As an animator manipulates an animated object (e.g., by modifying controls of a rigged character) using workstation 310, node graph 315 is locally evaluated to provide a first representation (e.g., a "low" fidelity representation) of the animated object. For example, depending on the availability of computing resources for workstation 310, the processing speed of workstation 310, and other factors, workstation 310 may evaluate the primary node graph (e.g., nodes 301-304 and 306) to provide a "lightweight" or fast representation of a rigged character that an animator may manipulate with little to no latency.

In addition, as further described below, workstation 310 may initiate a request (e.g., through application instance 300) for a server system (e.g., the distributed computation of FIG. 3) to process, based on the animator's local manipulation of the animated object, companion node graphs 351-352 that provide a more complex representation of the animated object. As the processed companion node graph data is made available to workstation 310, the initial low fidelity representation displayed in the viewport may be replaced with progressively higher fidelity representations.

In some implementations, the rendered node graph data on viewport 307 may also be pushed to the display of a mobile device 320, which is in direct communication 325 with desktop computer 310. Communication 325 may be implemented wirelessly using any number of communication protocols, such as LTE or 802.11x wireless LAN protocols. Alternatively, the desktop computer may be in wired communication 325 with the mobile device. The wired connection may be implemented using a variety of interfaces, such as USB 2.0, USB 3.0, Thunderbolt, or other available protocols. Thus, the rendered node graph data may be pushed from the desktop computer 310 to the mobile device 320 over wired or wireless communication media.

With reference now to node graph application instance 300, node graph 315 comprises five nodes 301, 302, 303, 304 and 306, companion node graphs 351-352, and one proxy node 305. A proxy node 305 is any computer module that is used to moderate data flow of a node graph. When the viewport 307 refreshes or a request to reevaluate the node graph is initiated, the proxy node 305 checks to see if its output 309 has been flagged for reevaluation. If the proxy node 305 has been flagged for reevaluation, the proxy node 305 may initiate a request for server system 350 to have connected input nodes and their corresponding input attributes processed in server 350. For example, the request may cause server system to process connected companion node graphs 351-352, input nodes 301-302, and their corresponding input attributes. In some cases, this request may be limited to nodes with flagged inputs. Proxy node 305 may comprise locality metadata that specifies on what server the nodes are processed. Moreover, if bandwidth permits, proxy node 305 may forward the data for local processing of companion node graphs 351 or 352.

Proxy node 305 may also determine whether companion node graph data has been previously processed and cached on the same LAN as the computing device, the computing device itself, or a storage medium attached to the computing device. If the companion node graph data has been cached, the proxy node 305 may return the cached data as its output 309 instead of calling the server application instance 340. In embodiments, a node graph 315 may comprise one or more proxy nodes 305 for receiving server processed data of companion node graphs. In this manner, higher fidelity representations of a primary node graph may be processed by a server system while an animator locally interacts with a lightweight version of an animated rig (e.g., a primary node graph).

Server 350, which runs node graph application instance 340, receives a copy of all user inputs associated with the nodes preceding proxy node 305 in the node graph (i.e., nodes 301-302). Server 350 comprises node graph 315', which is a copy of node graph 315, and companion node graphs 351' and 352' (i.e., copies of companion node graphs 351-352), which are evaluated according to the user inputs.

The placement of a proxy node 305 in the node graph may be determined by the node graph application instance based on where companion node graphs 351-352 receive input attributes from and send output attributes to the primary node graph. The placement of proxy nodes 305 may be static such that proxy nodes are situated at fixed locations in the graph. Alternatively, proxy nodes 305 may be dynamically placed by computing a good position in the node graph for their placement.

In application instance 300, when a user manipulates objects in viewport 307 or directly updates the input attributes of a node, the flagged inputs 308 and outputs 309 propagate their state forward. For example, if the user modifies the input attributes of nodes 301 and/or 302, then the inputs 308 and outputs 309 of nodes 303, 304, 305, and 306 are flagged. In this example embodiment, server system 350 receives a copy of all user inputs associated with nodes preceding proxy node 305 in the node graph—that is, nodes 301-302. When nodes 301-302 are flagged, the flagged inputs and outputs propagate their states forward to server nodes 301', 302'. In addition, the final node of companion node graphs 351' or 352' may signal proxy node 305 to reevaluate. In other embodiments, server 350 may maintain a copy of all user inputs associated with all nodes in application instance 300. Once all inputs 308 and outputs 309 have been flagged in the node graph 315, evaluation of the node graph 315 may be initiated automatically or when the viewport 307 refreshes.

Beginning with node 306, the node checks if its respective outputs 309 have been flagged. If the outputs are flagged, node 306 is instructed to evaluate itself. When node 306 evaluates, it determines that its respective inputs 308 are flagged and instructs connected node 304 and proxy node 305 to evaluate itself. On the local side, this process may repeat upstream to nodes 303, and 301-302.

After determining that its respective inputs 308 are flagged, proxy node 305 submits a request over communications network 200 to have all connected nodes (i.e., companion node graphs 351 or 352) and corresponding input attributes processed by server 350.

Server system 350, which receives a copy of all user inputs associated with nodes 301 and 302, runs node graph application instance 340, which processes nodes 301' and 302' (copies of nodes 301 and 302) and companion node graphs 351-352 based on the saved user inputs. Server 350 may process nodes 301' and 302' and companion node graphs 351-352 in the same manner as any other node graph application instance. That is, the evaluation process visits only flagged nodes. In other embodiments, server 350 may process all nodes regardless of whether they have been flagged.

In embodiments, server system 350 may process companion node graphs 351-352 in a hierarchical fashion. For example, if evaluation of companion node graph 351 results in a "medium" complexity representation of a rigged character's arm, and evaluation of companion node graph 352 results in a "high" complexity representation of the rigged character's arm, server system 350 may first process companion node graph 351 followed by companion node graph 352. As the "medium" complexity companion node graph 351 is processed, its outputs may be used to process the higher complexity companion node graph 352. In this manner, the "high" complexity node graph may be computed with improved efficiency or accuracy. Alternatively, companion node graphs 351 and 352 may be processed in parallel and separately.

The outputs of the companion node graph data are transmitted over communications network 200 back to proxy node 305. After receipt of the output of the companion node graph, the viewport may be refreshed. For example, node 306 may be reevaluated and processed in application instance 300 based on the input attributes received from proxy node 305, and the updated node graph may be rendered on viewport 307.

Figure 5:
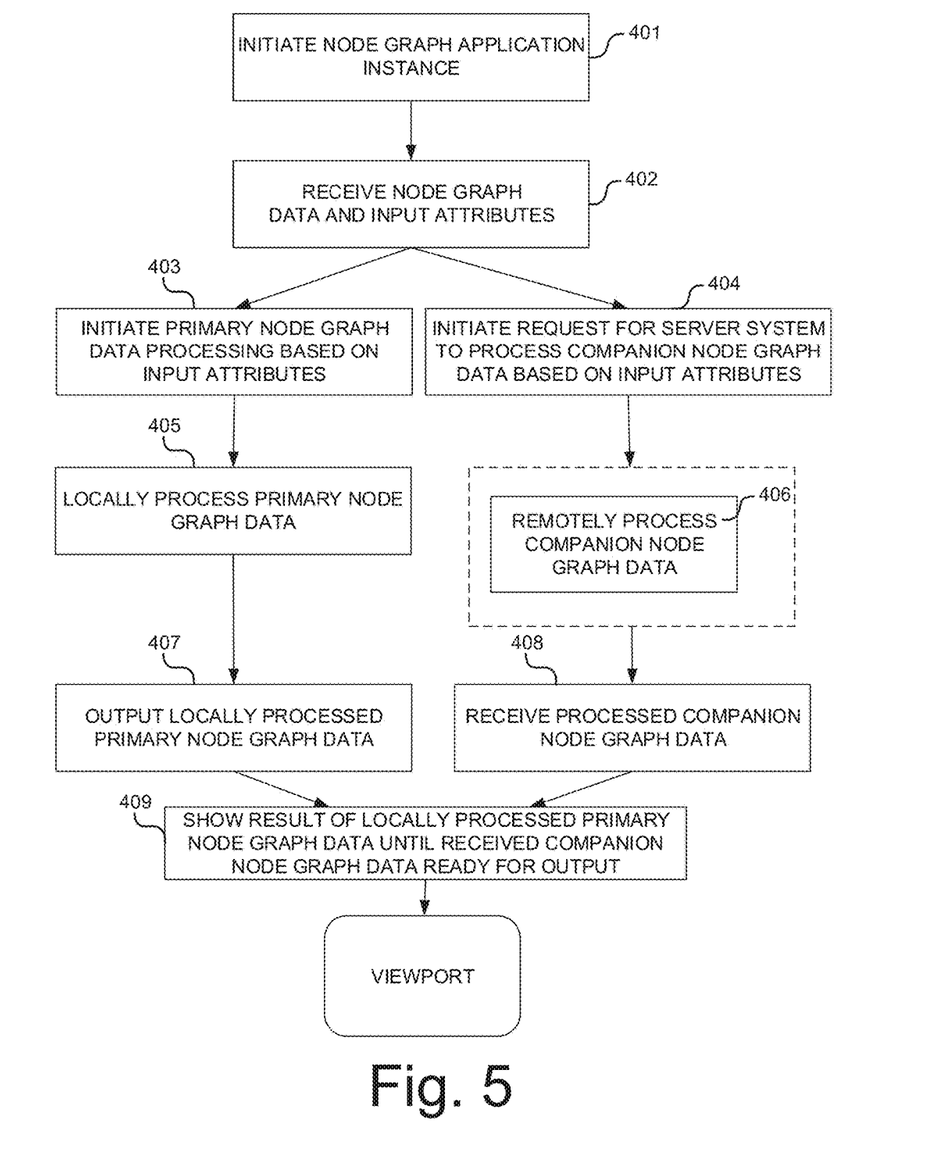
FIG. 5 illustrates a computing device side method of processing node graph data and input attributes.

FIG. 5 describes a method for leveraging distributed computing for processing a node graph like the one in application instance 300. At step 401, workstation 310 initiates a node graph application instance 300. In some implementations, the step of initiating a node graph application instance 300 may also comprise transmitting an instruction to a server 350 to initiate a node graph application instance comprising a copy of the same nodes as application instance 300. At step 402, the computing device receives input attributes and/or node graphs from the user of computing device 310, from storage on computing device 310, from network storage on communications network 200, or from some other source. For example, a primary node graph, one or more companion node graphs, and a single set of input attributes may be received. Step 402 may further comprise transmitting the node graphs and input attributes to server 350 to allow the server 350 to update its copy of nodes and associated input attributes.

At step 403, processing of the primary node graph based on a set of input attributes is initiated either automatically or in response to a request from the node graph application. For example, processing may be initiated in response to an animator moving a rig control of an animated character. The primary node graph data may be locally processed (step 405) and output to a viewport for display (step 407) until companion node graph data has been received and is ready for output (step 409).

At step 404, a request may submitted to a server system to process companion node graph data based on the same set of input attributes received by the primary node graph. For example, the request may be initiated at a proxy node in response to the same call that initiated primary node graph data processing. Prior to initiating the request, a check may be performed to determine if the companion node graph data has been previously processed and cached. If cached data is detected within the same LAN as workstation 310, workstation 310, or a storage medium attached to workstation 310, the cached data is applied and the request to the server system may be skipped.

In response to the request, a server remotely processes the companion node graph data (step 406) and transmits the results back. At step 408, the processed companion node graph data is received. Prior to updating the viewport, the companion node graph data may be used to reevaluate a portion of the primary node graph. At step 409, once the received companion node graph data is ready for output, the viewport is updated.

Figure 6:
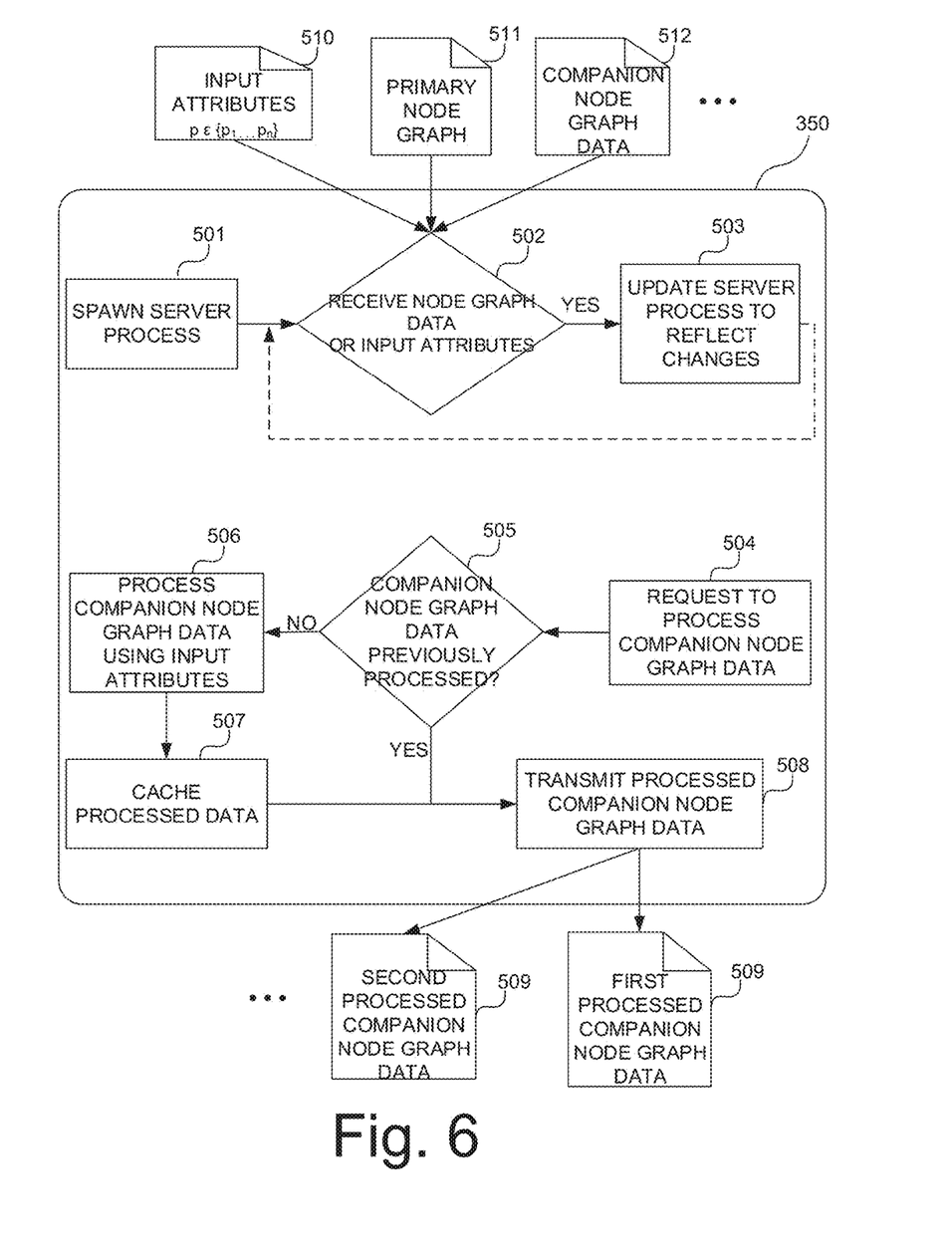
FIG. 6 illustrates a server side method of processing node graph data, including companion node graph data, and input attributes received from one or more computing devices.

In regards to the server side, FIG. 6 illustrates a server side method of evaluating node graph data, including companion node graph data. Server 350 spawns a process (step 501) configured to receive and process node graph data and input attributes. Each time the server receives node graph data and input attributes (step 502) from an instance of the node graph running on a client, the server updates the process to reflect the changes to the process' node graph data and input attributes (step 503).

As illustrated in this example, server 350 receives input attributes 512, primary node graph 510, and companion node graph data 511. Companion node graph data 511, when evaluated, may improve the fidelity of all or a subset of the results derived from an evaluation of primary node graph 510. Companion node graph data may comprise a set of nodes that are evaluated in place of nodes in primary node graph 510, additional data that is computed by primary node graph 510 (e.g., additional nodes or node connections), or some combination thereof. In one embodiment, primary node graph 510 may instantiate one or more companion node graphs during execution.

If the server receives a request to process companion node graph data based on the input attributes (step 504), the server begins to process the data. For example, the server may receive a request from a proxy node that instructs the server to evaluate companion node graph data based on received input attributes. A computing device may initiate the request for the proxy node when an animator manipulates a rigged character on a viewport.

The server process determines if the companion node graph has previously been evaluated and cached (step 505). If the node graph has not been previously evaluated and cached, the companion node graph is evaluated at the server based on the node graph input attributes (step 506).

The processed companion node graph is then cached (step 507) and transmitted (step 508) to one or more computing devices over communications network 200. The server-processed graphs may be transmitted automatically or in response to a request initiated by an application running on a computing device.

In one embodiment, server 300 may evaluate a hierarchy of companion node graphs, where each companion node graph in the hierarchy represents an increasing level of complexity. As companion node graphs are evaluated in increasing order of complexity, they may be made available to the requesting proxy node. By way of example, consider a first companion node graph, including 1000 nodes, that may be evaluated to provide a "medium" complexity representation of a character's leg, and a second companion node graph, including 2000 nodes, that may be evaluated to provide a "high" complexity representation of the same leg. In this example, server system 350 may first evaluate the first companion node graph and make the results available to the requesting proxy node. Server system 350 may then evaluate the second companion node graph and make the results available to the same proxy node. In some embodiments, the outputs of the evaluation of the first companion node graph may serve as inputs of the evaluation of the second companion node graph.

The server 350 may comprise a plurality of servers. These multiple servers perform grid-computing. Animation nodes, for example, may be evaluated in a distributed manner and then assembled into shots to be streamed to a plurality of computing devices. Additionally, processing tasks may be moved between the local node graph application and the remote server instance. This ability to dynamically spread the computation of node graphs across local or remote compute devices, may be live or on-demand. Moreover, node graph data stored on a server for reuse may be preloaded each time a server process is spawned.

The server 350 may be application agnostic (i.e. independent of the node graph application). For example, a server 350 may receive a plurality of node graphs for processing from a plurality of computing devices running different node graph applications such as Nuke®, Maya®, and Houdini®. Server 350 may comprise a computer module configured to provide syntactic and semantic interoperability. Semantic interoperability may be provided among these different node graph applications using a common information exchange reference model. For example, the server 350 may receive for processing node graph data from a computing device running a Maya® node graph application instance. Before transmitting the processed node graph data to a computing device running a Nuke node graph application instance, the server may translate the Maya® node graph data using a common information exchange reference model.

Additionally, the server process may provide a management system to track where data is computed, where it connects to in the primary node graph, where companion node graphs connect into the primary node graph, where companion node graphs connect into each other, who currently is editing/modifying the node graph, and whether or not the data is live or editable.

Figure 7:
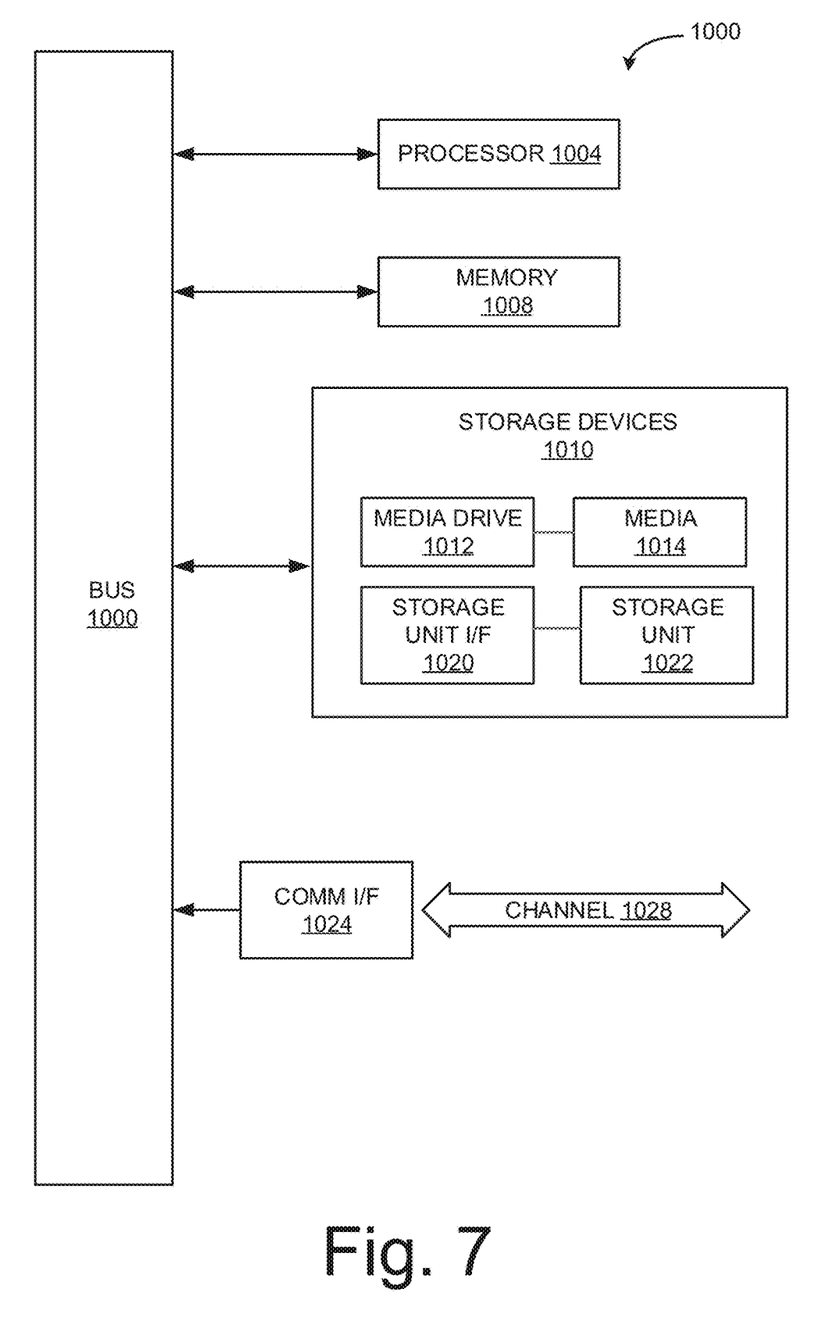
FIG. 7 illustrates an example computing module that may be used to implement various features of the system and methods disclosed herein.

FIG. 7 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 7. Various embodiments are described in terms of this example-computing module 1000. After reading this description, it will become apparent to a person skilled in the relevant art how to implement the application using other computing modules or architectures.

Referring now to FIG. 7, computing module 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid state drive, a magnetic tape drive, an optical disk drive, a CD or DVD drive (R or RW), or other removable or fixed media drive might be provided. Accordingly, storage media 1014 might include, for example, a hard disk, a solid state drive, magnetic tape, cartridge, optical disk, a CD, DVD, or Blu-ray, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1008, storage unit 1022, and media 1014. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. A method, comprising:
   spawning within a server system a server process that communicates over a network;
   receiving first node graph data, second node graph data, and set of input attributes at the server system, wherein the received first node graph data comprises a copy of one or more nodes preceding a proxy node in a node graph of a node graph application instance of a computing device, wherein the received second node graph data comprises a copy of a companion node graph preceding the proxy node in the node graph of the node graph application instance, wherein the companion node graph is a higher complexity representation of all or a subset of the one or more nodes;
   evaluating the second node graph data at the server process based on the set of input attributes, wherein evaluating the second node graph data comprises evaluating the copy of the companion node graph; and transmitting the evaluated second node graph data to the computing device.

2. The method of claim 1, further comprising:
receiving third node graph data at the server system, wherein the third node graph is a companion node graph of the first node graph, wherein the third node graph has a higher complexity than the second node graph;
evaluating the third node graph data at the server process based on the set of input attributes; and
transmitting the evaluated third node graph data to the computing device.

3. The method of claim 2, wherein the first node graph is associated with an animation rig.

4. The method of claim 3, wherein the third node graph is evaluated after the second node graph, wherein the second node graph and third node graph are hierarchical.

5. The method of claim 3, further comprising executing an instance of an application on the server system that can evaluate the received node graph data and input attributes.

6. The method of claim 3, further comprising:
receiving the evaluated second node graph data at the computing device;
evaluating, at the computing device, a portion of the first node graph based on the evaluated second node graph data;
receiving the evaluated third node graph data at the computing device; and
evaluating, at the computing device, a portion of the first node graph based on the processed third node graph data.

7. The method of claim 1, wherein the first node graph instantiates the second node graph.

8. The method of claim 1, further comprising: caching the evaluated second node graph data, wherein evaluating the second node graph data and caching the evaluated second node graph data are performed if the server process determines that it has not previously evaluated the second node graph data.

9. The method of claim 1, wherein the server evaluated second node graph data is transmitted to the computing device in response to a request initiated at an application running on the computing device.

10. The method of claim 1, further comprising:
receiving the evaluated second node graph data at the computing device; and
evaluating, at the computing device, a portion of the first node graph based on the evaluated second node graph data.

11. The system of claim 1, wherein the first node graph instantiates the second node graph.

12. A system comprising:
a server configured to:
spawn a server process that runs inside of a grid computing instance that communicates over a network;
receive first node graph data, second node graph data, and set of input attributes, wherein the first node graph is associated with animation rig, wherein the received first node graph data comprises a copy of one or more nodes preceding a proxy node in a node graph of a node graph application instance of a computing device, wherein the received second node graph data comprises a copy of a companion node graph preceding the proxy node in the node graph of the node graph application instance, wherein the companion node graph is a higher complexity representation of all or a subset of the one or more nodes;
evaluate the second node graph data at the server process based on the set of input attributes, wherein evaluating the second node graph data comprises evaluating the copy of the companion node graph; and
transmit the evaluated second node graph data to the computing device.

13. The system of claim 12, wherein the server is further configured to:
receive third node graph data, wherein the third node graph is a companion node graph of the first node graph, wherein the third node graph has a higher complexity than the second node graph;
evaluate the third node graph data at the server process based on the set of input attributes; and
transmit the evaluated third node graph data to the computing device.

14. The system of claim 13, wherein the third node graph is evaluated after the second node graph, wherein the second node graph and third node graph are hierarchical.

15. The system of claim 13, further comprising: the computing device, wherein the computing device is configured to:
receive the evaluated second node graph data;
evaluate a portion of the first node graph based on the evaluated second node graph data;
receive the evaluated third node graph data; and
evaluate a portion of the first node graph based on the evaluated third node graph data.

16. The system of claim 12, wherein the server evaluated second node graph data is transmitted to the computing device in response to a request initiated at an application running on the computing device.

17. The system of claim 12, wherein the computing device is configured to:
receive the evaluated second node graph data; and
evaluate a portion of the first node graph based on the evaluated second node graph data.

18. A method, comprising:
initiating a node graph application instance at a computing device, the node graph application instance displaying an object comprising a rig;
evaluating first node graph data of the rig at the application instance based on input attributes received at the computing device, wherein the first node graph data comprises one or more nodes preceding a proxy node in a node graph of the node graph application;
initiating a request at the computing device for a server system to evaluate second node graph data of the rig based on the input attributes, wherein the second node graph data comprises a companion node graph preceding the proxy node in the node graph of the node graph application instance, wherein the companion node graph is a higher complexity representation of all or a subset of the one or more nodes; and
receiving the server system evaluated second node graph data at a viewport in the application.

19. The method of claim 18, further comprising:
receiving the evaluated first node graph data at the viewport of the application, wherein the step of receiving the server system evaluated second node graph data at the viewport comprises replacing the evaluated first node graph data with the evaluated second node graph data at the viewport.

20. The method of claim 18, further comprising:
initiating a request at the computing device for a server system to evaluate third node graph data of the rig based on the input attributes, wherein the third node graph data is a higher complexity representation of the second node graph data; and
receiving the server system evaluated third node graph data at a viewport in the application.

* * * * *